UNITED STATES PATENT OFFICE.

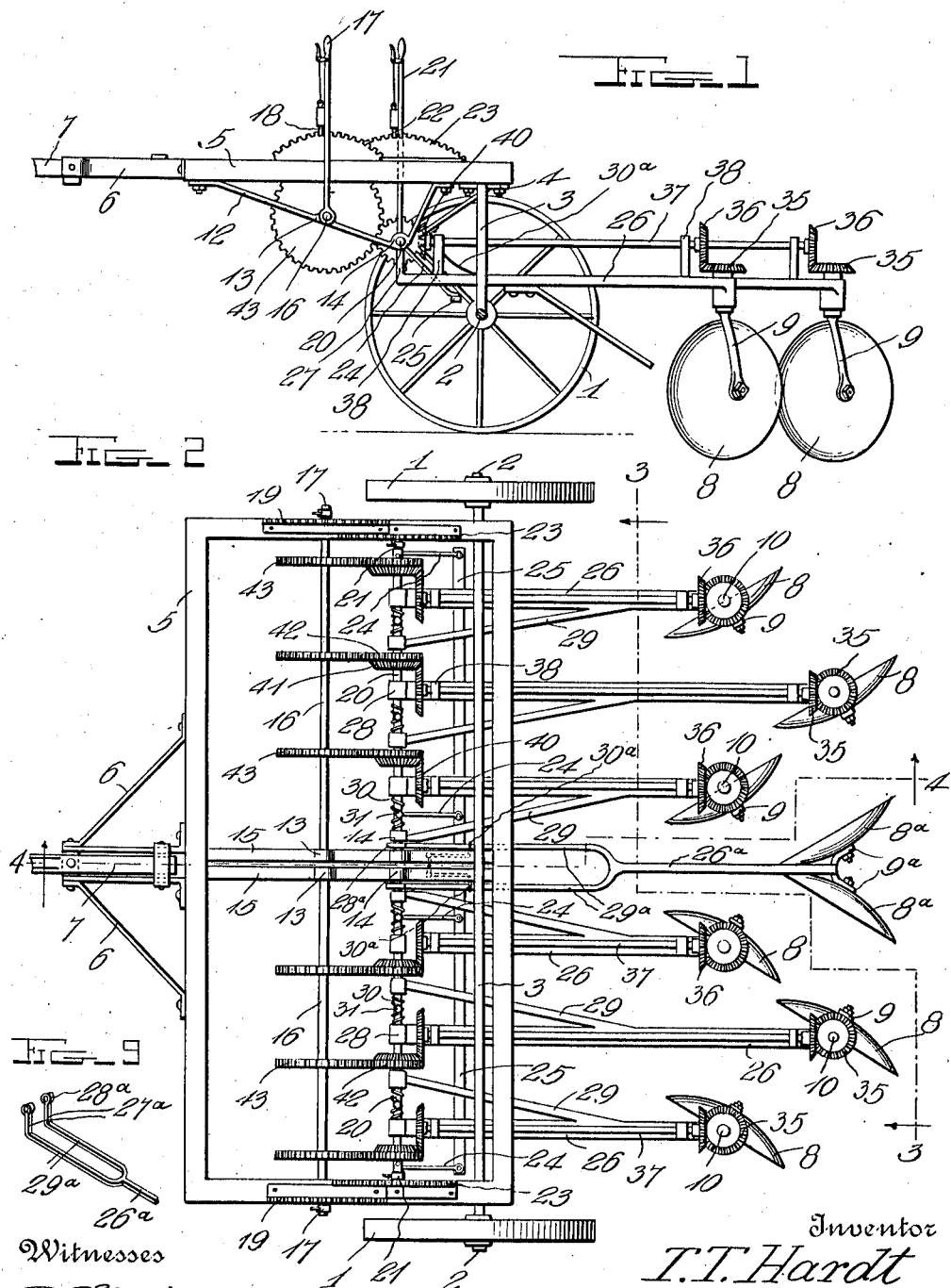

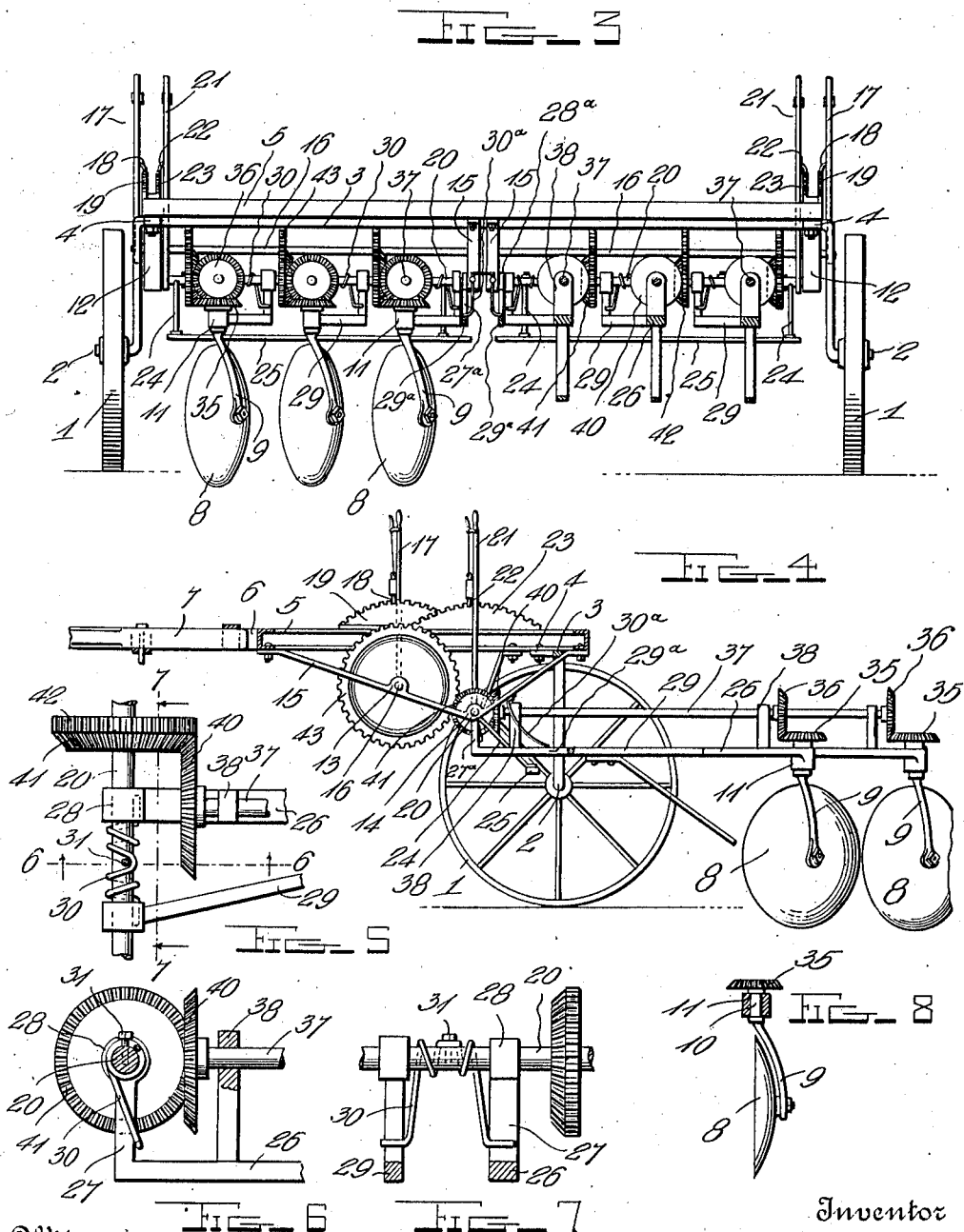

TYSON THOMAS HARDT, OF BLUEMONT, VIRGINIA.

REVERSIBLE HARROW.

1,026,912.  Specification of Letters Patent.  Patented May 21, 1912.

Application filed August 14, 1911. Serial No. 643,903.

*To all whom it may concern:*

Be it known that I, TYSON THOMAS HARDT, a citizen of the United States, residing at Bluemont, in the county of Loudoun and State of Virginia, have invented certain new and useful Improvements in Reversible Harrows; and I do declare the following to be a full, clear, and exact description of the invention, such as will enable others skilled in the art to which it appertains to make and use the same.

This invention relates to disk harrows, and more especially to those wherein the disks are mounted in pivoted gangs; and the object of the same is to construct a harrow of this type wherein each gang of disks is pressed normally toward the earth with yielding force by means on its individual beam or support, and yet the disks of the two gangs are capable of being set or reversed at the will of the driver and as the land conditions may require. This and other objects are carried out by the construction hereinafter more fully described and claimed and shown in the drawings wherein—

Figure 1 is a side elevation and Fig. 2 a plan view of this improved harrow; Fig. 3 is a rear elevation and partial section on the line 3—3 of Fig. 2; Fig. 4 is a central longitudinal section on the line 4—4 of Fig. 2; Fig. 5 is an enlarged detail in plan, and Figs. 6 and 7 are sections thereof on the lines 6—6 and 7—7 of Fig. 5; Fig. 8 is an enlarged detail, being an edge view of the harrow; all these details to be referred to hereinafter; Fig. 9 is a perspective detail of the inner end of the fixed harrow-beam.

In the drawings the numeral 1 designates the wheels mounted on the dropped ends 2 of an axle 3 which is by preference rigidly supported by clips 4 beneath the framework 5, the latter being preferably formed of U-iron as best seen in Fig. 4 and carrying the usual hounds 6 and tongue 7 needing no further explanation.

It has not been thought necessary to show the whiffletrees, nor the seat, nor other details which form no part of the present invention.

I might here say that the disks 8 are pivotally mounted in hangers 9 which are deflected laterally to one side of their shanks 10 so that the latter may be journaled in upright bearings 11 on a line directly over the periphery of the disks, all as best seen in Fig. 8; but this specific construction of the disk and its direct support are described now because the use thereof is optional rather than necessary.

Coming now more particularly to the gist of the present invention, the drawings show this improved harrow as made in two gangs, each gang being here illustrated as comprising three disks and the beams on which they are supported and the connections between said beams and the frame; but it will be understood that there may be more or less disks in each gang and there might be a larger number of gangs although I preferably employ but two as shown. The gangs are duplicates of each other, each occupying one half of the width of the entire machine as best seen in Fig. 2, and by preference the harrows are also duplicates of each other so that a description of one will suffice for all. Carried by each end bar of the frame 5 is a drop frame 12 (see Figs. 1 and 4) of substantially right-angular construction, its front arm having two bearings 13 and 14 and the latter disposed at the angle between its front and rear arms. At about the mid-length of said frame 5 are disposed two other drop frames 15 having similar bearings 13 and 14 in alinement with those just described. (The following description refers to one half of the frame only). Mounted in the two bearings 13 is a power shaft 16 having at one end a lever or handle 17 carrying a catch 18 moving over a toothed rack 19 so that the shaft may be adjusted in its bearings. Mounted in the two bearings 14 is a lifting shaft 20 also having at one end a handle or lever 21 having a catch 22 moving over a toothed rack 23 whereby this shaft may be adjusted within its bearings. In Fig. 2 the levers 17 and 21 are shown on the end-bars of the main frame 5, but it is obvious they could be otherwise disposed if desired and I have so illustrated them for sake of clearness. Secured rigidly to and projecting obliquely downward and rearward from the lifting shaft are two arms 24, their lower rear ends connected by a transverse lifting bar 25 for a purpose to be described below. Mounted loosely upon this shaft 20 are the several beams of the gang of harrows, each beam 26 having its front end upturned as at 27 and provided with an eye 28 through which the shaft 20 passes loosely; and each beam being also by preference braced as at 29 by an oblique bar or brace having a similar eye at its front end loosely surrounding said shaft.

Between these two eyes (see Figs. 5 and 7) a strong spring 30 is coiled upon the shaft with its center engaging a pin 31 therethrough and its extremities hooked behind the upturned front ends 27 of the beam and its brace so that the normal tendency of the spring is to throw the rear ends of said beam and brace downward, and this tendency can be increased or decreased by setting the handle lever 21. The lifting bar 25 extends across beneath the various beams and their braces as best seen in Fig. 2, and when said handle 21 is moved forward far enough over its toothed rack this lifting bar raises all the beams and lifts the disks out of the ground in a manner which will be described below. The rear end of the beam 26 carries the bearing 11 in which is journaled the upright shank 10 of the hanger 9 supporting the disk 8, as best seen in Figs. 4 and 8. Thus it will be seen that the lifting shaft 20 with its handle or lever 21 is useful for raising the harrows entirely out of the ground when they are not to be used, and holding them there when the entire device is to be moved over the ground upon its wheels 1; or by moving the handle 21 in the other direction the lifting bar 25 allows the beams 26 to descend until the disks 8 cut into the ground to the desired depth.

The upper extremity of each shank 10 carries a bevel gear 35 meshing with another numbered 36 which is secured to the rear end of a shaft 37 journaled in bearings 38 rising from the beam 26, and the front end of this shaft carries a bevel gear 40 meshing with another numbered 41 which is mounted loosely on the shaft 20 and has a pinion 42 on its hub as seen in Fig. 5. Meshing with said pinion is a larger gear 43 which is fast on the power shaft 16, the size of this gear relative to the pinion 42 being such that when said shaft is turned through a comparatively small arc the several shafts 37 will be turned to a considerable degree.

From this construction it will be seen that by properly setting the handle 17 the train of gears from the power shaft 16 to the shanks 10 of the various disks will cause the turning of the latter within their bearings 11 at the rear ends of their beams 26.

As at first above suggested, this harrow is made in two entirely independent gangs or banks, with a separate pair of levers for each, and it follows that the various disks in either bank may be raised or lowered or set at any oblique angle entirely independent of the similar action taking place in the various disks of the other bank.

A machine constructed as above described may be used as a straddle-row cultivator if the two banks or groups of harrow disks are separated slightly along the center of the machine, as will be clear; but the general use of the machine will be as a harrow, in which case the dished side of the disks will be set toward the outside of either group or gang so that the soil taken up thereby will be spread in two paths which are diverted from each other rather than being piled up into a ridge. Moreover, if the machine should be used on a hill side where its constant tendency is in one direction, say toward the right, the angle of the disks in the two gangs could be set accordingly, as by setting those in the right gang at a rather slight inclination and those in the left gang at a steeper inclination, and if necessary permitting the disks in the left gang to descend further into the earth. This adaptability of the machine may also be found useful where the soil is different along the paths being traveled by the two gangs, as where the machine is drawn alongside a field which may have been plowed up to a certain point, as well understood.

I consider it important that the mechanism for controlling the depth of the disks in each gang should be within as easy reach and as readily manipulated by the operator as the mechanism for controlling the angle at which the disks in the gang may be set; because sometimes one adjustment is necessary and sometimes another, and sometimes both. Attention is directed to the fact that when the lever 21 is adjusted, the lifting shaft 20 is turned in its bearings 14, but the various beams 26 are thrown downward only by spring force added to the weight of the parts carried thereby; but on the other hand when the lever is adjusted in the opposite direction, the lifting bar 25 raises the various beams positively out of the ground. On the contrary, manipulation of the lever 17 through the train of gears causes the positive rotation of the shank 10 of each skid within its bearing 11 so that the angle of the disk to the line of progress is definitely controlled, no matter what the position of the beam which may rise and fall freely around the shaft 21.

The parts of this improved machine are of the desired sizes, shapes, proportions and materials; and changes in details may be made as come within the spirit of my invention.

In order that the harrows in each group may be rotated completely without interfering with each other, I preferably dispose them in staggered relation, and when there are three in a group the central one will be set a little to the rear of the other two as seen in Fig. 2.

When this machine is not to be used as a straddle-row cultivator, but it is desired to harrow the ground completely, I employ what I call a relatively fixed harrow beam and harrow (because its disks are not rotatable) located between those of the two groups or banks with its disks disposed a little in rear of those at the inner sides of said groups. The two disks 8ᵃ of this beam are rigidly mounted in a hanger 9ᵃ which holds their flat sides at an acute angle to each other, and the hanger is bolted or rigidly fixed to a beam 26ᵃ which stands in direct alinement with the tongue 7. Its front end is forked, and the arms 29ᵃ of the fork extend beneath the main frame, over the inner extremities of the lifting bars 25, and are upturned at their front ends as at 27ᵃ and provided with eyes 28ᵃ mounted loosely on the two shafts 20 adjacent the inner bearings 14. A spring 30ᵃ is secured beneath the drop frames 15 and presses the arms 29ᵃ of said fork downward, so that the beam 26ᵃ and the disks carried thereby are depressed and caused to rest upon the inner extremities of the lifting bars 25. It will be seen from Fig. 2 that the disks carried by this beam, and which are not revoluble like the others, travel in rear of the tongue and pass along a path which would otherwise be left untouched by the two banks or groups, so that when this device is used my harrow can be employed to work the entire surface, but it is obvious that by omitting this device the machine may be used as a straddle-row cultivator. When either lifting bar 25 is raised, its inner extremity raises one arm of the fork 29ᵃ and hence the entire beam 26ᵃ and with it the relatively fixed disks, although the latter will be lowered to operative or working position when both lifting bars are let down and both gangs of disks are engaging the earth. The relatively fixed disks by preference stand about on transverse alinement with the rearmost of the disks in both gangs. It is obvious that this device will need no brace because of the fork, and also because it has its disks set at angles which work against each other and there is no side draft.

What is claimed as new is:

1. In a disk harrow, the combination with the wheeled frame, a transverse shaft therein, a series of beams having eyes loosely mounted on said shaft, and springs for normally depressing their rear ends; of the disks whose hangers have upright shanks journaled in said beams, a pinion mounted loosely on said shaft adjacent each beam, a train of gearing connecting this pinion with the shank of the disk carried by this beam, means for setting the position of said pinions in gangs, and means for lifting said beams in gangs.

2. In a disk harrow, the combination with the wheeled frame, a transverse shaft therein, a series of beams having eyes loosely mounted on said shaft, and springs for normally depressing their rear ends; of the disks whose hangers have upright shanks journaled in said beams, a pinion mounted loosely on said shaft adjacent each beam, a train of gearing connecting this pinion with the shank of the disk carried by this beam, a second shaft journaled across the frame, a series of gears fast thereon and engaging said pinions in gangs, means for setting the gear-shafts from a point on the frame, and independent means for lifting said beams in gangs from a point on the frame.

3. In a disk harrow, the combination with the wheeled frame, a transverse shaft therein, a series of beams having eyes loosely mounted on said shaft, and springs for normally depressing their rear ends; of the disks whose hangers have upright shanks journaled in said beams, means for adjusting said shanks in their bearings from a point on the frame, arms depending rigidly from said shaft alongside the endmost beams, and a lifting bar connecting said arms and passing beneath the beams.

4. In a disk harrow, the combination with the wheeled frame, a transverse shaft therein, a series of beams having eyes loosely mounted on said shaft, and springs for normally depressing their rear ends; of the disks whose hangers have upright shanks journaled in said beams, a pinion mounted loosely on said shaft adjacent each beam, a train of gearing connecting this pinion with the shank of the disk carried by this beam, a second shaft journaled across the frame, a series of gears fast thereon and engaging said pinions in gangs, means for setting the gear-shaft from a point on the frame, arms depending from said first-named shaft alongside the endmost beams, and a lifting bar connecting said arms and extending beneath the beams in gangs.

5. In a disk harrow, the combination with a main frame having a lifting shaft journaled therein, means for setting its position within the frame, and beam lifting mechanism carried by this shaft; of a series of beams each having an upturned front end provided with an eye mounted loosely on said shaft, a brace projecting obliquely from said beam and having an upturned portion provided with an eye also journaled on said shaft, a pin through the latter between said eyes, a spring coiled on the shaft with its center engaging said pin and its ends hooked behind said upturned portions, a disk carried by the rear end of each beam, and means for adjusting its angle.

6. In a disk harrow, the combination with a main frame, a lifting shaft journaled therein, means for setting its position within the frame, and beam lifting mechanism carried by this shaft; of a series of beams each having an eye mounted loosely on said shaft, a brace projecting obliquely from said beam and having an eye also journaled on said shaft, a pin through the latter between said eyes, a spring coiled on the shaft and engaging said pin and the beam and brace, disks whose hangers have upright shanks journaled in bearings at the rear ends of said beams, bearings along the beams, shafts journaled in said bearings, bevel gears between the rear ends of the shafts, and the upper ends of said shanks, and means on the main frame for adjusting the position of said shafts in gangs so as to set the disks at various angles.

7. In a disk harrow, the combination with a main frame, a lifting shaft journaled therein, means for setting its position within the frame, and beam lifting mechanism carried by this shaft; of a series of beams each having its front end provided with an eye mounted loosely on said shaft, a brace projecting obliquely from said beam and having an eye also journaled on said shaft, a pin through the latter between said eyes, a spring coiled on the shaft with its center engaging said pin and its ends hooked behind said beam and brace, disks whose hangers have upright shanks journaled in bearings at the rear ends of said beams, bearings along the beams, shafts journaled in said bearings, bevel gears between the rear ends of the shafts, and the upper ends of said shanks, a bevel gear at the front end of each shaft, a corresponding bevel gear mounted loosely on the lifting shaft and having a pinion fast on its hub, a power shaft journaled in the frame and having a series of gears engaging said pinions, and means for turning the power shaft so as to adjust the angle of said disks in gangs.

8. In a disk harrow, the combination with a main frame, a lifting shaft journaled therein, means for setting its position within the frame, and beam lifting mechanism carried by this shaft; of a series of beams each having an upturned front end provided with an eye mounted loosely on said shaft, a pin through the latter, a spring coiled on the shaft and engaging said pin and said upturned portion, disks whose hangers have upright shanks journaled in bearings at the rear ends of said beams, bearings along the beams, shafts journaled in said bearings, bevel gears between the rear ends of the shafts and the upper ends of said shanks, a bevel gear at the front end of each shaft, a corresponding bevel gear mounted loosely on the lifting shaft and having a pinion fast on its hub, a power shaft journaled in the frame and having a series of gears engaging said pinions, and means for turning the power shaft so as to adjust the angle of said disks in gangs.

9. In a disk harrow, the combination with the main frame, two gangs of harrows whose beams are pivotally mounted in said frame, means for setting all the disks in each gang, lifting bars extending under the beams of the gangs, and independent mechanisms for elevating said bars; of a central harrow, a beam therefor forked at its front end and the arms of the fork extending over the inner extremities of said lifting bars, pivotal connections between said arms and the main frame, and a spring for normally depressing said beam.

In testimony whereof I have hereunto set my hand in presence of two subscribing witnesses.

TYSON THOMAS HARDT.

Witnesses:
 R. W. LEVIS,
 LEWIS GLOVER.

Copies of this patent may be obtained for five cents each, by addressing the "Commissioner of Patents, Washington, D. C."